Jan. 17, 1928.
W. H. SMYTH
1,656,610
CHAIN LINK HINGE
Filed April 25, 1921
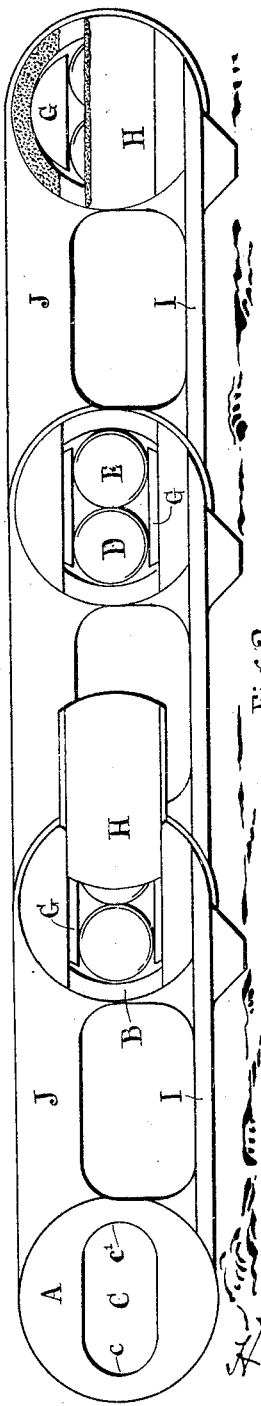
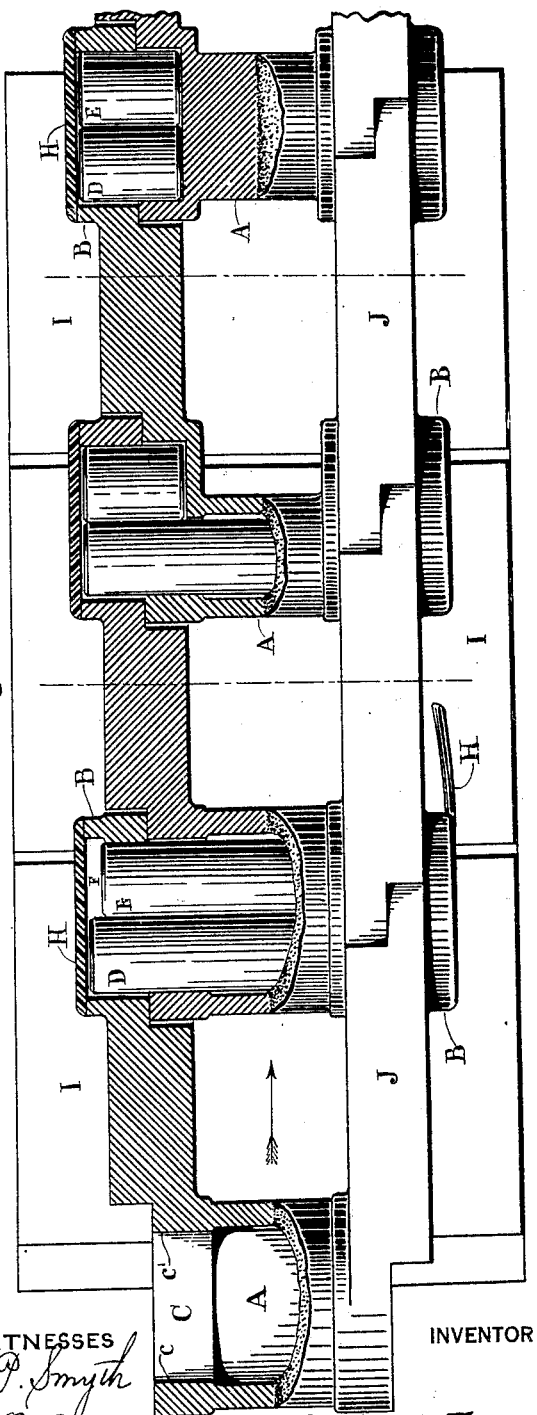

Patented Jan. 17, 1928.

1,656,610

UNITED STATES PATENT OFFICE.

WILLIAM H. SMYTH, OF BERKELEY, CALIFORNIA.

CHAIN LINK HINGE.

Application filed April 25, 1921. Serial No. 464,401.

My invention relates to hinge joints, adapted to chains, and especially to chains for power transmission, load carrying, and the like.

The object of my invention is to diminish friction without lubrication, to prolong the life and increase the efficiency of flexing-joint load-carrying devices operating under exacting conditions of grit, dirt and heavy duty; also to provide a device of this character without tool-fitted parts and requiring neither skill nor the employment of tools to assemble, hence cheap to construct.

I attain these desirable objects by means of the roller-hinge constructions hereinafter described, reference being had to the accompanying drawings.

Fig. 1 is a side elevation of a track chain the closure slide of one hinge being omitted and portions broken away for better illustration.

Fig. 2 is a plan view partly in section, showing my roller hinge with two modifications.

I have shown my invention applied to a track-chain, as a typical example of power transmission and load-carrying duty under adverse conditions.

The chain link as illustrated has an end-member A, suitable to form one hinge-end of a link. B, the other end-member of the link, in the form shown is a shell made in two parts, separated to accommodate the insertion of the end-member A of a co-acting link. The inner side of each separated shell part adjacent to its co-acting link-end is open, its outer side being closed, thus constituting an enclosure for the hinge parts when assembled.

The link-end-member A is provided with a slot or recess C, elongated longitudinally of the chain, for the reception of the round pins or rollers. D and E are pins or rollers projecting into the slot or recess C and contacting with each other adjacent to the hinge center of motion. Thus the pins form rolling hinge abutments each to the other and to adjacent co-acting links.

The slot or recess C is very slightly longer than the combined diameters of the pins D and E, to permit a little slack, and of a width to give an easy fit to the pins. The ends of the slot or recess are preferably circular, and provide a seat $c$ for pin D and a seat $c^1$ for pin E.

The interior of the link-end-member B forms a circular chamber F of a diameter very slightly larger than the combined diameters of the pins D and E. The inner wall surface of chamber F, as shown, forms an annular trackway for the rollers D and E alternately, as the direction of motion of the chain is reversed.

Loosely fitting segments, G—G, are provided in the chamber F, one above and one below the rollers, as shown at G, G in Fig. 1.

For inspection or renewal of the enclosed parts a closable aperture is provided in the shell members, which I have shown as a closure plate H, slidable in an angular-sided slide-way. Thus the parts when assembled constitute a dirt-excluding enclosed roller-hinge.

It is important that the closure H shall not be dislodged by the incidents or accidents of operation; but it is also requisite that closure H shall be conveniently removable. It is undesirable here to employ the usual closure appliances such as locks, latches, hinges, bolts, pins, set-screws, etc., to secure the closure H against dislodgment, as such would require additional parts and shop work on each link, with consequent expense and subsequent attention, besides presenting dangerous projections.

To meet these diverse requirements, I make the closure H with a loose fit for its slide and then give to it a slightly bowed or humped form longitudinally, its slide-way being straight. By this contrivance I provide a driving fit to the closure H which no jarring of operation can disturb, but which permits closure H to be readily removed or replaced as required.

In addition to these important functions, the humped shape of the closure renders another valuable service in that it effects a constant dirt-excluding snug fit between its contact surfaces and the end wall of the shell. It constitutes, in fact, a simple and effective self-locking closure the surface of which is flush with the end surface of the enclosing shell, and thus free of danger fraught projections.

As shown in Fig. 1, the pins D and E may both extend from one chamber F to the other through the slot or recess C in the end-member A; or one pin, D, may extend through, and the other, E, may be in two pieces which extend from chamber F only into its co-acting slot or recess C; or both pins may be similarly shortened—all of which is clearly illustrated in Fig. 2.

In work involving load-carrying duty, as for example bucket dredger chains and track-layer tracks, the abutment segments G perform the duty of load bearers, equalizing the load pressure upon both links by transferring a part of the load from the shell end-member to the rollers, thence to the lower abutment segments, and so to both link end-members.

In its ground run the principal functions of a track-chain are power transmission and load bearing. This stretch of the chain is substantially straight, and the pull coincides with the horizontal plane of the roller-pins: consequently they present their united strength to the pulling and shearing strains.

When the chain flexes in passing around the end sprocket-wheels, its load-bearing function ceases, hence the stress upon the segments is removed, and during flexure they serve as guide alignments for the projecting ends of the anti-friction rollers in shell B, B.

In work in which side thrusts and torsion strains are apt to be encountered, it is desirable to tie the separated shell end-members B, B together for strength and rigidity. In a track-chain, as illustrated, this may be accomplished by the tread-plate I. In other characters of service any other suitable tie or strut may be employed.

In the track-chain used for illustration end-member B is also tied to end-member A by connecting element J, which constitutes the load-bearing track.

In operation (the chain traveling as indicated by the arrow in the drawings), seat c will transmit the pull to the pin D, which will transmit it to pin E, and thence to the inner wall of shell B, and the flexure of the chain will cause the pin E to roll upon the annular trackway surface of the shell. Reversing the motion of the chain causes a correspondingly reverse action. Thus sliding friction is eliminated, and there is effected a true anti-friction-bearing action of the pins or rollers upon the annular track surfaces.

As the device herein set forth shows for the first time an enclosed roller-hinge joint, I claim the invention broadly, unlimited as to modifications within the skill of mechanics in the light of my disclosure.

What I claim is:

1. A device of the character set forth, comprising members in hinge association, a trackway concentric to the hinge center, and pins contacting contiguous to the hinge center of motion, rollable on the trackway.

2. In a device of the character set forth, a shell member, rollers therein contacting contiguous to the hinge center of motion, and an annular trackway upon which they roll.

3. In a device of the character set forth, rollers contacting contiguous to the hinge center of motion, an annular trackway upon which they roll, and an enclosing shell.

4. In a device of the character set forth, an enclosing shell having an aperture provided with a slideway and a cover adapted to close said aperture slidable therein, one bent in relation to the other.

5. A device of the character set forth comprising a series of co-acting links each link having an enclosing shell, a roller in the shell adapted to rotate by peripheral contact with a co-acting link adjacent to the hinge center of motion, a substantially similar link series laterally adjacent thereto, and connecting means adapted to maintain their operative relation.

6. A device of the character set forth comprising a longitudinal series of track-links each having an enclosing shell, a roller in the shell adapted to roll by peripheral contact with a co-acting link adjacent to the hinge center of motion, a substantially similar series parallel thereto, and a tread-plate secured to each of the corresponding members of the two series adapted to maintain their operative relation.

7. A device of the character set forth comprising a longitudinal series of links each having an enclosing shell provided with a closable aperture with a closure therefor, a roller in the shell adapted to roll by peripheral contact with a co-acting link adjacent to the hinge center of motion, a substantially similar series parallel thereto, and connecting means between the corresponding members of the series adapted to maintain their operative relation.

8. A device of the character set forth, comprising hinge end-members in flexible association, rollers therein, and loose abutment segments contacting with the rollers.

9. A device of the character set forth comprising a longitudinal series of links each having an enclosing shell provided with a closable aperture with a closure therefor, a roller in the shell adapted to roll by peripheral contact with a co-acting link adjacent to the hinge center of motion, a substantially similar series parallel thereto, and a plate secured to each of the corresponding members of the series adapted to maintain their operative relation.

10. A device of the character set forth comprising a longitudinal series of links each having an enclosing shell provided with a closable aperture, a slidable closure to the aperture, a roller in the shell adapted to roll by peripheral contact with a co-acting link adjacent to the hinge center of motion, a substantially similar series parallel thereto, and connecting means between the corresponding members of the series adapted to maintain their operative relation.

11. A chain comprising hinged links having a freely rotatable cylindrical hinge-pin eccentric to the axis of hinge flexure uniting endwise adjacent links.

12. A chain comprising rigidly connected parallel links having an enclosed freely rotatable cylindrical hinge pin eccentric to the axis of hinge flexure uniting endwise adjacent links.

13. A chain comprising hinged links, an enclosed hinge-pin eccentric to the axis of hinge flexure uniting endwise adjacent links, and a roller in peripheral contact with the pin contiguous to the axis of hinge flexure.

14. A chain comprising hinged links, a hinge-pin eccentric to the axis of hinge flexure uniting endwise adjacent links, and an enclosed roller in peripheral contact with the pin contiguous to the axis of hinge flexure.

15. A chain comprising hinged links, a hinge-pin eccentric to the axis of hinge flexure uniting endwise adjacent links, a roller at each end of the pin in peripheral contact therewith, an enclosure for the roller provided with a closable aperture adapted to permit the ready withdrawl of the pin.

16. A chain link provided with a suitable hinge abutment, another link formed with an integral enclosing shell having a roller therein in peripheral contact with the abutment contiguous to the hinge center of motion.

17. A chain link having an operably endwise moveable rollable pin, another link with a convex abutment contacting therewith adjacent to the hinge center of motion.

18. A chain comprising links and loose cylindrical pins in each hinge in continuous peripheral contact with each other at each hinge center.

19. A chain comprising links and operably endwise moveable rollers in peripheral rolling contact with each other contiguous to the hinge center of motion.

20. A chain link and an endwise moveable rollable pin seated therein rollable by contact with a co-acting link contiguous to the link hinge center of motion.

21. A chain link and a hinge pin seated therein eccentric to the hinge center of motion, endwise and rotatably moveable by contact contiguous to the hinge center with a co-acting similarly disposed pin in an adjoining link.

22. A chain comprising links and a hinge connection between the links consisting of endwise moveable pins rotatable by peripheral contact with each other contiguous to the hinge center of motion.

23. A chain comprising links and pins loosely moveable laterally with reference to each other and in peripheral rolling contact contiguous to the hinge center of motion.

24. A chain comprising links each provided with a shell member enclosing loose cylindrical pins in peripheral contact with each other contiguous to the hinge center.

25. A chain comprising links each provided with a shell normally closed at its ends, hinge means therein comprising pins in peripheral rolling contact contiguous to the hinge center of motion and a closable aperture in the shell member adapted to permit the removal of the pins.

WILLIAM H. SMYTH.